Sept. 13, 1938. J. G. BUTTS 2,130,117
APPARATUS FOR TRANSPLANTING TREES AND THE LIKE
Filed Sept. 8, 1937. 4 Sheets-Sheet 1

Inventor
J. G. BUTTS
By Robb & Robb
Attorneys

Fig. 2.

Inventor
J. G. BUTTS

Patented Sept. 13, 1938

2,130,117

UNITED STATES PATENT OFFICE 2,130,117

APPARATUS FOR TRANSPLANTING TREES AND THE LIKE

Jean G. Butts, Cato, N. Y.

Application September 8, 1937, Serial No. 162,939

16 Claims. (Cl. 214—3)

This invention appertains to apparatus for handling and transporting trees, poles, and the like, and more especially, to apparatus for transplanting trees and resetting poles.

In my Patent No. 1,889,820, granted December 6, 1932, I have described and illustrated the method and one form of apparatus for practicing the method as applied to the transplanting of trees. The apparatus embodies primarily a vehicle having a frame rockably mounted thereon and adapted to be secured to the tree or pole, as the case may be, and power means for rocking the frame in a vertical plane about a horizontal axis. The present invention principally has to do with an improved mechanism for imparting rocking movement to the frame, and while the mechanism has been shown in the accompanying drawings and will be hereinafter described as applied to a rocking frame similar to that shown in my above mentioned patent, it is to be understood that it is not to be limited to this particular frame construction, nor in fact, to the art of tree transplanting devices, since the same has a more general application and can be used for other purposes such as for actuating dump bodies and the like.

In the development of the present invention, I have sought particularly to provide a power hoisting mechanism by means of which sufficient force may be applied to the rocking frame to expeditiously lift the tree or pole out of the ground and reset the same with a minimum of effort, and which is capable of handling very large and heavy trees and poles.

A further object of the invention is to provide an improved means for transmitting power to the rocking frame in its rocking movement in opposite directions, as distinguished from a power actuation of the frame in one direction only.

Another object of the invention is to provide an improved frame actuating mechanism of relatively simple and rugged construction, and which may be readily controlled by the operator from a station preferably accessible from the driver's seat of the vehicle upon which the apparatus as a whole is carried, thereby obviating the necessity for the operator to leave his seat on the vehicle during the transplanting and transporting operations.

A still further object of the invention is to provide an improved apparatus for handling and transporting trees and the like, which apparatus is preferably constructed in the form of a separate unit which can be mounted on a vehicle chassis or truck frame of any desired type. In other words, my new apparatus readily lends itself to manufacture as a complete unit in itself, and can be supplied to the manufacturer of motor vehicles, and sold with said vehicle as a special purpose vehicle; or on the other hand, it can be sold directly to a trucking concern or truck owner for application to the truck without requiring any substantial alteration of the truck.

One of the specific objects of the invention is to provide in combination with a rocking frame, a power operated actuating mechanism therefor which includes a flexible connector such as a chain or cable operatively connected with a source of power and to opposite ends of the frame, and a pivotal lever having its free extremity disposed to engage beneath the rocking frame and movable relatively to the pivotal axis of the frame so as to exert a powerful lifting force on the frame in one direction, responsive to actuation of the flexible connector in one direction by the source of power, and the flexible connector serving to directly impart a powerful force to the rocking frame to rock the same in the opposite direction responsive to actuation of the flexible connector in the opposite direction by the power source.

Other objects and advantages of the invention will be hereinafter described, and the novel features thereof defined by the appended claims.

In the drawings:

Figure 3 is a somewhat diagrammatic fragmentary top plan view of the transplanting apparatus shown in Figures 1 and 2.

Like reference characters designate corresponding parts in the several figures of the drawings.

The transplanting apparatus preferably embodies a sub-frame 1 adapted to be mounted upon and suitably secured to the chassis or frame 1' of a motor vehicle, generally designated 2. The motor of the vehicle serves not only to propel the vehicle in the usual manner, through the intermediary of a transmission, generally designated 3, but also to actuate the transplanting apparatus during the various stages of the transplanting operations.

Figure 1:
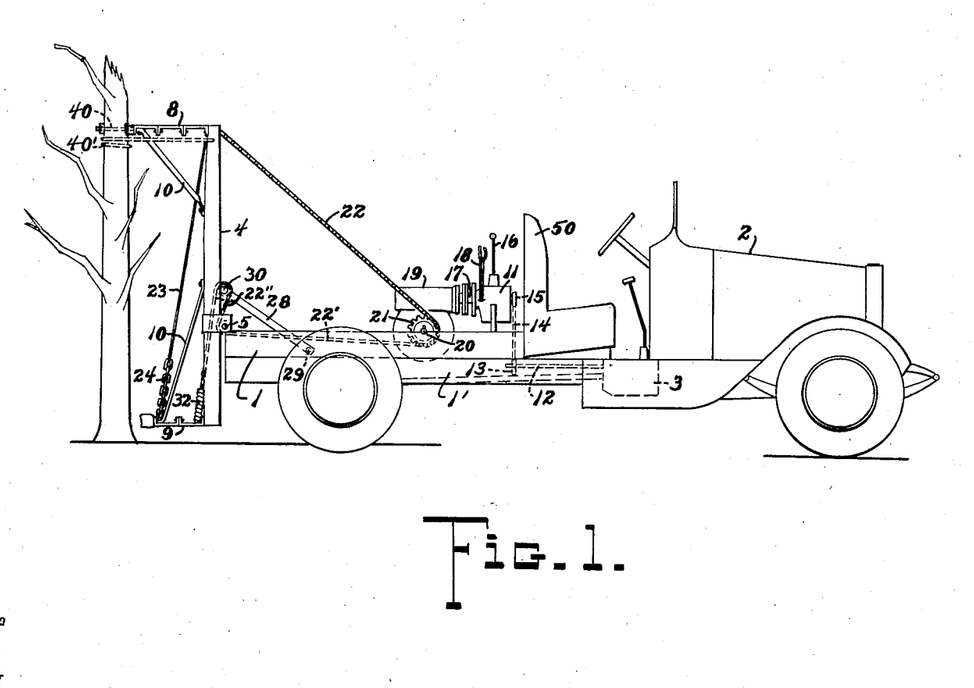
Figure 1 is a view in side elevation of a transplanting apparatus embodying my invention, and illustrating the condition just prior to the commencement of the tree lifting operation, or at the completion of the operation of lowering the tree to its reset position.
Figure 2:
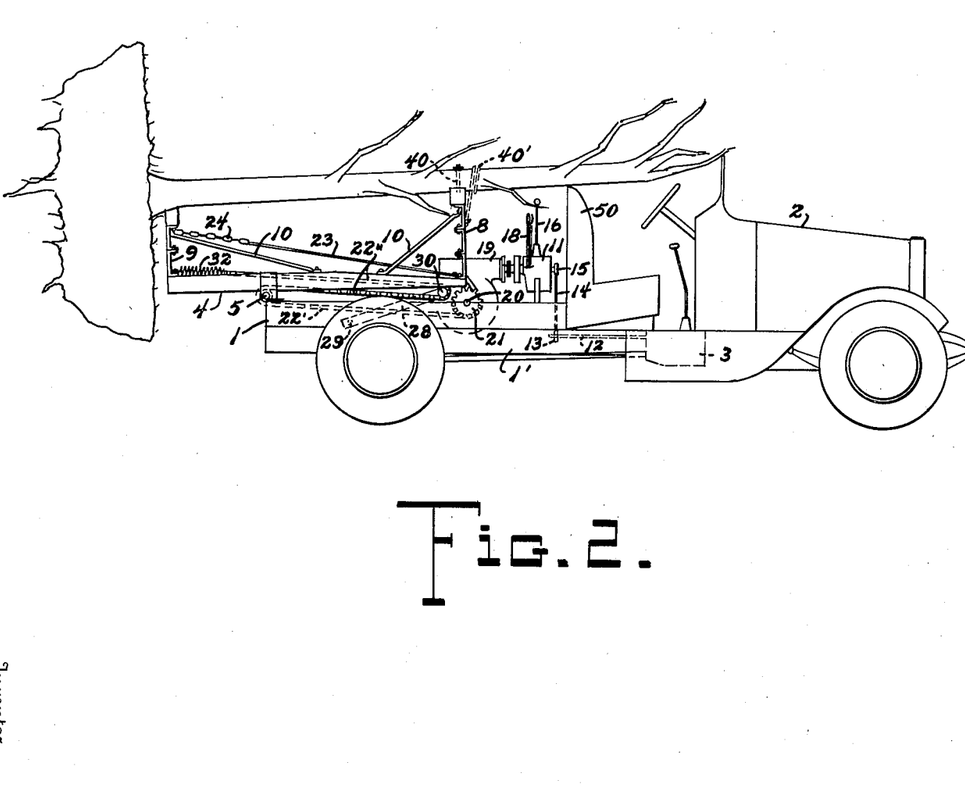
Figure 2 is a view generally similar to Figure 1, showing the apparatus in a condition for transporting the tree to a new site.

4 designates a rocking frame or lever mounted upon the sub-frame 1 and pivotally interconnected intermediate its opposite ends, as at 5, to the rear extremity of the sub-frame so as to be rockable in a vertical plane about a horizontal axis. This rocking frame 4 is capable of being rocked in one direction to a substantially vertical position, as shown in Figure 1, and in the opposite direction to a substantially horizontal position, as shown in Figure 2, with the major portion of the frame 4 overlying the sub-frame 1 and chassis frame 1' and resting thereon. In other words, the fulcrum point, about which the frame 4 rocks, is preferably substantially closer to the rear end of the rocking frame, thus providing a relatively long lever arm 6 extending upwardly from the fulcrum point when the frame 4 is in the position shown in Figure 1, and a relatively short lever arm 7 extending downwardly from the fulcrum point.

Figure 4:
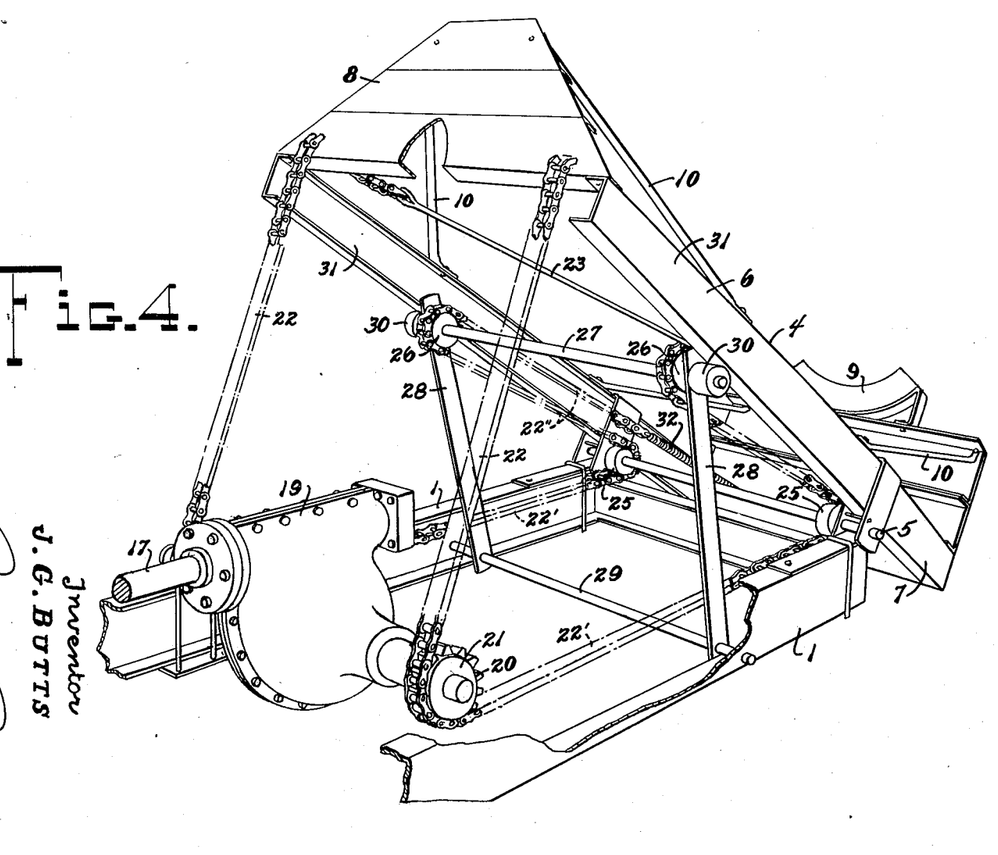
Figure 4 is an enlarged fragmentary perspective view of the tree transplanting unit which can be mounted on the chassis frame of any suitable transporting vehicle, and showing the rear end of the sub-frame upon which the rocking frame is mounted, together with the power mechanism for actuating the rocking frame, the rocking frame being illustrated in a position intermediate the extreme limits of its rocking movement.

Saddles 8 and 9 are provided at the forward or upper end and at the rear or lower end, respectively, of the rocking frame 4. The saddle 8 is preferably somewhat longer than the saddle 9, or in other words, projects outwardly farther from the frame 4. As best seen in Figures 2 and 4, the saddles are built up by means of a plurality of metal channel sections suitably secured together in superposed relation and braced by braces 10 extending between the saddles and the frame 4, but it is to be understood that I do not wish to be limited to this particular construction since the same may be modified as desired.

Passing now to the actuating mechanism by means of which a rocking motion may be imparted to the rocking frame 4 in opposite directions, this mechanism includes an auxiliary power transmission 11 mounted on the sub-frame 1 and operatively connected with the vehicle transmission 3 by means of a power take-off shaft 12, having a sprocket 13 mounted on one end thereof and connected by a chain 14 to a sprocket 15 carried by the input shaft of the auxiliary transmission unit 11. The transmission 11 is preferably of the reversible type, and is provided with a control lever 16 which is manually shiftable to selective positions to cause the output shaft 17 of the transmission to be selectively driven in opposite directions, or to be rendered inactive, according to the selected position of the control lever 16. Brake means, including a brake lever 18, is also preferably provided as a part of the auxiliary power transmission unit 11, so that the output shaft 17 may be positively held against rotation when operation of the transmission is discontinued. The output shaft 17 is operatively connected to a drive gear unit, generally designated 19, which is preferably of the worm and pinion type, and having a power drive shaft 20 extending therethrough and laterally projecting beyond the opposite sides of the same so as to lie substantially transversely of the chassis frame 1. This transverse drive shaft 20 may be suitably journaled in bearings mounted on the sub-frame 1 at opposite sides thereof so as to support the gear unit while permitting free rotation of the shaft in opposite directions. Adjacent to each end of the transverse power shaft 20, there is mounted on the shaft a sprocket 21, preferably arranged at the inner sides of the longitudinal frame members of the sub-frame 1 with sufficient clearance to permit the sprockets to rotate responsive to rotation of the shaft 20, without interfering with the chassis frame. Each sprocket 21 is operatively interconnected with the rocking frame 4 by means of a chain 22. One end of the chain 22 is suitably anchored directly to the forward end of the rocking frame 4, or, as specifically shown in the drawings, passes through the saddle 8 and is connected to one end of a tie rod 23, the opposite end of which is suitably anchored to the rear end of the frame 4, as by means of the chain 24. From the forward end of the rocking frame 4, each drive chain 22 passes around and under its sprocket 21 and thence rearwardly towards the pivotal axis of the rocking frame. The transverse shaft 5 which pivotally connects the rocking frame 4 to the rear end of the sub-frame 1 has mounted thereon at the inside of the longitudinal sub-frame members, a pair of rollers 25, respectively aligned with the sprockets 21. Each of the drive chains 22 passes under one of these rollers 25 and thence forwardly under and around and over corresponding rollers 26 carried by a transverse shaft 27 mounted in the free extremities of a pair of levers 28, each of which is pivotally connected to the sub-frame 1 at the inside of the longitudinal frame members thereof, as by means of a transverse shaft 29. The shaft 29 which pivotally connects the levers 28 with the sub-frame 1 is disposed substantially forwardly and somewhat below the pivotal axis of the rocking frame 4, as best seen in Figures 1, 2 and 4, and together with the length of the respective levers 28, has a definite relation to the position of the shaft 5, about which the rocking frame 4 pivots, as will hereinafter become more fully apparent. Rollers 30 are mounted on the outer extremities of the transverse shaft 27 which is carried by the free ends of the levers 28, and these rollers 30 are arranged at the outer sides of the levers 28 so as to engage beneath the opposite longitudinal side frame members 31 of the rocking frame 4 with a free rolling action. From the rollers 26, the drive chains 22 pass towards the rear end of the rocking frame 4 to which the free ends of the chains are anchored through the intermediary of a pair of coil springs 32, there being one spring 32 for each drive chain 22. The springs 32 serve to take up slack in the drive chains 22 and to permit variation in the effective chain length responsive to actuation of the drive chains by the sprockets 21, which results in imparting a rocking motion to the levers 28 from a substantially horizontal or forwardly inclined position, as shown in Figure 2, to a rearwardly inclined position, as shown in Figure 1.

According to the construction just described and shown in the drawings, when the power shaft 20 is driven in a direction imparting rotation to the sprockets 21 in a clockwise direction, as viewed in Figure 4, or in a counterclockwise direction as viewed in Figures 1 and 2, and assuming the rocking frame 4 is in a substantially horizontal position as shown in Figure 2, the drive chains 22 are actuated in such manner that the lower reaches 22' move forwardly towards the sprockets 21. However, as the rear ends of the drive chains 22 are anchored to the rear end of the rocking frame 4, with a loop 22" provided in each chain intermediate these anchored ends and the sprockets 21, having the rollers 26 disposed within the loops, the resulting action is a progressive foreshortening of the loops 22", thereby producing a progressive rocking movement of the levers 28 from their position shown in Figure 2, towards their position shown in Figure 1. This rocking movement of the levers 28 produces a powerful lifting action under the forward end of the rocking frame 4 through reason of the engagement of the rollers 30 on the outer ends of the transverse shaft 27 under the longitudinal frame members 31 of the rocking frame. As the loops 22" progressively foreshorten in the manner just described, the rollers 30 roll rearwardly along the under side of the frame members 31. The yieldable anchorage of the drive chains 22, afforded by the coil springs 32, automatically yields to allow the levers 28 to freely rock from the position shown in Figure 2, to the position shown in Figure 1, although it will be understood that this yielding action may be effective for only a part of the rocking movement, while for the remainder of the rocking movement, the coil springs 32 merely serve to take up and prevent undue slack in the drive chains. As the lower reaches 22' of the drive chains 22 advance forwardly towards the sprockets 21, the chains are paid off the sprockets at the opposite sides thereof, that is, between the sprockets 21 and the forward end of the rocking frame 4, thereby permitting the front end of the rocking frame to be hoisted in rocking the frame from its normal substantially horizontal position shown in Figure 2, to its substantially vertical position shown in Figure 1.

In order to rock the frame 4 in the opposite direction from that just described, or in other words, from its vertical position shown in Figure 1 to its horizontal position shown in Figure 2, it is merely necessary to reverse the rotation of the sprockets 21. Thus, through a rotation of the sprockets 21 in a counter-clockwise direction, as viewed in Figures 1, 2 and 4, a powerful pull is applied directly to the forward or uppermost end of the rocking frame 4 through means of the drive chains 22. As the sections of the chains 22 between the sprockets 21 and the forward or upper end of the rocking frame 4 are foreshortened, the chains are paid off at the opposite sides of the sprockets 21, thereby permitting the loops 22" to elongate and allow the levers 28 to rock from their rearwardly inclined position shown in Figure 1, to their forwardly inclined position shown in Figure 2, with a consequent lowering action of the forward end of the rocking frame 4. As just described, the operation of the actuating mechanism for the frame 4, in the case of rocking the frame from the position of Figure 1 to the position of Figure 2, is just the reverse of that previously described.

The use of my improved apparatus in the transplanting or resetting of trees, poles and the like, is fully described in my prior patent hereinbefore mentioned, and to which reference may be had for such further detailed explanation of the present invention as may be desired. Briefly, in the case of transplanting a tree, the operation is as follows: First, a trench is dug to a suitable depth around the base of the tree and at a substantial distance from the tree trunk, depending upon the size of the tree, so that a considerable amount of soil will be left around the roots of the tree when the tree is lifted out of the ground. In trenching around the tree, any long or heavy roots which may be encountered are preferably cut off, but not so close to the base of the tree as to jeopardize its life. Then the vehicle on which the transplanting apparatus is mounted is backed up towards the tree trunk preparatory to securing the rocking frame 4 to the trunk of the tree. The rocking frame 4 is rocked to its substantially vertical position shown in Figure 1 either before or after the vehicle has been brought close to the tree, the rocking movement being accomplished by first disengaging the vehicle transmission 3 so as to render the same temporarily inoperative to propel the vehicle, and thereafter engaging the auxiliary transmission 11 with the worm gear unit 19, through selective manipulation of the control lever 16. The usual clutch pedal on the motor vehicle may be availed of to control the operation of the shaft 17 which connects the auxiliary transmission 11 with the gear unit 19 after the control lever 16 has been shifted to a position rendering the transmission 11 operative to drive the transverse power shaft 20 and sprockets 21 in the desired direction. Thus the power mechanism for rocking the frame 4 may be controlled in a manner generally corresponding to the usual control of the motor vehicle, it being understood, of course, that the motor vehicle drive is preferably put in neutral whenever the rocking frame 4 is to be actuated. After bringing the rocking frame 4 to the position shown in Figure 1 with the long saddle 8 near the trunk of the tree and at a substantial distance above the base thereof, a hole is bored diametrically through the tree trunk so as to register with a hole provided in the upper flange of the uppermost channel section of the saddle 8. A bolt 40 is then passed through the tree trunk and through the hole in the saddle just referred to, so as to firmly secure the tree to the saddle 8, as will be best understood from reference to Figure 1. The bolt, of course, should be of a sufficient size to withstand the force required to lift the weight of the tree, and the aditional force which is applied through the rocking frame 4 to break the subjacent roots which were not severed in the trenching operation free from the soil. The bolt 40 preferably serves as the sole means of connecting the tree to the rocking frame 4, since it minimizes the likelihood of skinning or scarring the tree during the transplanting operations. On the other hand, a chain, cable, rope or similar flexible connector, designated 40', wrapped around the tree trunk and secured to the frame 4, may be substituted for the bolt 40, or used together with the bolt 40, to secure the tree against the saddle 8 on the frame 4. Suitable padding material is preferably interposed between the tree trunk and the saddles on the rocking frame.

When the tree has been attached to the frame 4, as just described, and as shown in Figure 1, the control lever 16 is shifted to its position to cause the transmission 11 to drive the power shaft 20 and sprockets 21 in a direction exerting a downward pull on the portions of the chains 22 which extend from the sprockets to the forward end of the frame 4. As the frame 4 commences its rocking movement towards its horizontal position, the tree will be lifted free from the ground preferably through a series of intermittent applications of power to the chains 22 in order not to cause the vehicle to dump over backwards. As will be obvious, the front end of the vehicle serves to counterbalance the reactive force of the tree on the rocking frame 4, so that the capacity of the apparatus is limited only by the size and strength of its component parts and the weight of the vehicle. If necessary, the front end of the vehicle can be weighted down to prevent the same from rising off the ground, or it may be temporarily anchored in any suitable manner to prevent the front end of the vehicle from being lifted off the ground at the commencement of the downward pull of the forward end of the rocking frame 4 to pull the tree out of the ground. When the tree has been freed from the ground, the rocking movement of the frame 4 is preferably continued until it assumes a substantially horizontal position as shown in Figure 2, or at least to a position in which the base of the tree and the ball of soil which remains adherent to the roots of the tree sufficiently clears the ground to enable the tree to be transported on the vehicle to its new site. With the frame 4 in the position shown in Figure 2, the weight of the tree is borne by the frame 4, and consequently by the vehicle. I have found that with the construction as illustrated in the drawings I am able to expeditiously and economically handle trees up to sixty feet or more in height and having a trunk diameter as great as sixteen inches or more, as measured breast-high. Obviously, by making the parts of the rocking frame 4 and its actuating mechanism proportionately larger and heavier, and using a larger and heavier motor vehicle, trees even larger than mentioned above may be readily handled. As the frame 4 reaches its tree transporting position, or at any time during the tree lifting actuation of the rocking frame, the brake lever 18 may be set so as to prevent the frame from tilting rearwardly. Likewise, during actuation of the rocking frame 4, the brake lever may be suitably manipulated to prevent the frame from moving too fast. Both of the levers 16 and 18, constituting the controls for the frame actuating mechanism, are accessible from the operator's seat 50 on the vehicle, thus obviating the necessity for the operator to leave his seat during the transplanting operation. The apparatus is also applicable to the transportation of trees and the like with the tree secured to the rocking frame 4 in a substantially vertical position, corresponding to that shown in Figure 3 of my prior patent.

In resetting the tree, the ground is excavated to an extent sufficient to receive the base of the tree, or in other words, the ball of soil which is left attached to the roots thereof. Then the vehicle is backed up near the excavation and the rocking frame 4 is actuated by the power mechanism in the reverse direction from that just described in the case of loading the tree onto the vehicle. As soon as the tree has been set into the excavation, the bolt 40 and such other fastenings as may have been employed to secure the tree to the rocking frame 4 are disconnected from the frame 4 leaving the vehicle free to be driven away for further use. The transplanting operation may be completed in the usual manner to condition the tree for further life in its new site.

The advantages of constructing the transplanting apparatus as a separate, substantially self-contained, portable unit which can be applied to any avialable transporting vehicle are self-evident from the foregoing description, taken together with the drawings, and need not be further described.

While the specific details have been herein shown and described, the invention is not confined thereto as changes and alterations may be made without departing from the spirit thereof as defined by the appended claims.

Having thus described my invention, what I claim as new and desire to secure by Letters Patent is—

1. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, a lever pivotally mounted on the vehicle at one side of the axis of the rocking frame and having its free extremity movably engageable beneath the rocking frame so as to rock the rocking frame responsive to pivotal movement of the lever, and means operatively connecting the power shaft with the rocking frame and with the pivotal lever aforesaid whereby to positively impart pivotal movement to the lever in one direction responsive to rotation of the power shaft in one direction, and to directly impart rocking movement to the rocking frame in the opposite direction responsive to rotation of the power shaft in the opposite direction.

2. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, a lever pivotally mounted on the vehicle at one side of the axis of the rocking frame and having a roller carried by its free extremity arranged for rolling engagement with the under side of the rocking frame responsive to pivotal movement of the lever, and means operatively connecting the power shaft with the rocking frame and with the pivotal lever aforesaid whereby to positively impart pivotal movement to the lever in one direction responsive to rotation of the power shaft in one direction, and to directly impart rocking movement to the rocking frame in the opposite direction responsive to rotation of the power shaft in the opposite direction.

3. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, a lever pivotally mounted on the vehicle at one side of the axis of the rocking frame and having its free extremity movably engageable beneath the rocking frame so as to rock the rocking frame responsive to pivotal movement of the lever, and a flexible connector operatively connecting the power shaft with the rocking frame and with the pivotal lever aforesaid whereby to positively impart pivotal movement to the lever in one direction responsive to rotation of the power shaft in one direction, and to directly impart rocking movement to the rocking frame in the opposite direction responsive to rotation of the power shaft in the opposite direction.

4. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, a lever pivotally mounted on the vehicle at one side of the axis of the rocking frame and having its free extremity movably engageable beneath the rocking frame so as to rock the rocking frame responsive to pivotal movement of the lever, and a flexible connector operatively connecting the power shaft with the rocking frame, one end of the flexible connector being operatively connected with one end of the rocking frame, and the flexible connector extending about the axis of the power shaft and thence about the axis of the rocking frame and having its opposite end operatively connected to the opposite end of the rocking frame so as to form a loop intermediate the axis of the rocking frame and the latter end of the flexible connector, the pivotal lever aforesaid having means embraced by said loop whereby to positively impart pivotal movement to the lever in one direction responsive to rotation of the power shaft in one direction and thereby rock the rocking frame in one direction, while permitting pivotal movement of the rocking lever and rocking movement of the rocking frame in the opposite direction responsive to rotation of the power shaft in the opposite direction to directly apply force to the rocking frame through the flexible connector.

5. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, a lever pivotally mounted on the vehicle at one side of the axis of the rocking frame and having its free extremity movably engageable beneath the rocking frame so as to rock the rocking frame responsive to pivotal movement of the lever, and a flexible connector operatively connecting the power shaft with the rocking frame, one end of the flexible connector being operatively connected with one end of the rocking frame, and the flexible connector extending about the axis of the power shaft and thence about the axis of the rocking frame and having its opposite end yieldably connected to the opposite end of the rocking frame so as to form a loop intermediate the axis of the rocking frame and the latter end of the flexible connector, the pivotal lever aforesaid having means embraced by said loop whereby to positively impart pivotal movement to the lever in one direction responsive to rotation of the power shaft in one direction and thereby to rock the rocking frame in one direction, while permitting pivotal movement of the rocking lever and rocking movement of the rocking frame in the opposite direction responsive to rotation of the power shaft in the opposite direction to directly apply force to the rocking frame through the flexible connector.

6. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon, about said axis, said last named means comprising a power transmission including a power shaft adapted to be driven thereby in opposite directions, a lever pivotally mounted on the vehicle at one side of the axis of the rocking frame and having its free extremity movably engageable beneath the rocking frame so as to rock the rocking frame responsive to pivotal movement of the lever, and means operatively connecting the power shaft with the rocking frame and with the pivotal lever aforesaid whereby to positively impart pivotal movement to the lever in one direction responsive to rotation of the power shaft in one direction, and to directly impart rocking movement to the rocking frame in the opposite direction responsive to rotation of the power shaft in the opposite direction, said last named means including a sprocket mounted on the power shaft, a chain extending about said sprocket and having one end secured to one end of the rocking frame, the opposite end of the chain extending from the sprocket about the axis of the rocking frame and thence towards the opposite end of the rocking frame with an intervening loop formed therein, a coil spring interposed between the last named end of the chain and the opposite end of the rocking frame and serving to yieldably anchor the chain thereto, and means carried by the pivotal lever aforesaid and embraced within the chain loop.

7. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, and extending transversely across the vehicle, a pair of levers pivotally mounted on the vehicle, one at each side thereof, at one side of the axis of the rocking frame and having their free extremities respectively movably engageable beneath the rocking frame at opposite sides thereof so as to rock the rocking frame responsive to pivotal movement of the levers, and means operatively connecting the power shaft with the rocking frame and with the pivotal levers aforesaid, whereby to positively impart pivotal movement to the levers in one direction responsive to rotation of the power shaft in one direction, and to directly impart rocking movement to the rocking frame in the opposite direction responsive to rotation of the power shaft in the opposite direction, said last mentioned means comprising a flexible connector at each side of the vehicle, each having one end operatively connected with one end of the rocking frame, and thence extending about the power shaft and about the axis of the rocking frame, the opposite end of each flexible connector being yieldably anchored to the rocking frame and providing a loop intermediate its yieldably anchored end and the axis of the rocking frame, and means carried by the pivotal levers and embraced by the respective loops aforesaid in each flexible connector.

8. In a tree transplanting device, a vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission including a power shaft adapted to be driven thereby in opposite directions, and extending transversely across the vehicle, a pair of levers pivotally mounted on the vehicle, one at each side thereof, at one side of the axis of the rocking frame, and having their free extremities respectively movably engageable beneath the rocking frame at opposite sides thereof so as to rock the rocking frame responsive to pivotal movement of the levers, and means operatively connecting the power shaft with the rocking frame and with the pivotal levers aforesaid, whereby to positively impart pivotal movement to the levers in one direction responsive to rotation of the power shaft in one direction, and to directly impart rocking movement to the rocking frame in the opposite direction responsive to rotation of the power shaft in the opposite direction, said last mentioned means comprising a flexible connector at each side of the vehicle, each having one end operatively connected with one end of the rocking frame, and thence extending about the power shaft and about a roller rotatably mounted with its axis concentric with the axis of the rocking frame, the opposite end of each flexible connector being yieldably anchored to the rocking frame and providing a loop intermediate its yieldably anchored end and the axis of the rocking frame, and roller means carried by the pivotal levers and embraced by the respective loops aforesaid in each flexible connector.

9. In a tree transplanting device, a motor vehicle, a frame pivotally mounted on the vehicle intermediate its ends to swing vertically about a horizontal axis, and having its opposite ends provided with saddles for engaging the trunk of a tree or the like, means for securing the tree to at least one of said saddles, and means for rocking the frame with the tree thereon about said axis, said last named means comprising a power transmission and control means therefor to selectively and operatively connect the transmission to the motor of the motor vehicle whereby to drive the transmission in opposite directions, a power shaft operable by the transmission aforesaid and mounted transversely on the vehicle for rotation in opposite directions responsive to selective operation of the transmission, a lever pivotally mounted on the vehicle at one side of the axis of the rocking frame and having its free extremity movably engageable beneath the rocking frame so as to rock the rocking frame responsive to pivotal movement of the lever, and means operatively connecting the power shaft with the rocking frame and with the pivotal lever aforesaid, whereby to positively impart pivotal movement to the lever in one direction responsive to rotation of the power shaft in one direction, and to directly impart rocking movement to the rocking frame in the opposite direction responsive to rotation of the power shaft in the opposite direction.

10. The combination with a rocking frame, of means for rocking the same in opposite directions in a vertical plane about a horizontal axis, said means including a power shaft rotatable in opposite directions and disposed substantially parallel to the axis of the frame, a pivotal lever mounted intermediate the power shaft and the axis of the frame for swinging movement in opposite directions with its free extremity movably engaging beneath the rocking frame, and means operatively connecting the power shaft with the rocking frame and with the pivotal lever whereby to positively impart pivotal movement to the lever and rocking frame in one direction responsive to rotation of the power shaft in one direction, and to directly impart rocking movement to the rocking frame in the opposite direction responsive to rotation of the power shaft in the opposite direction.

11. The combination with a rocking frame, of means for rocking the same in opposite directions in a vertical plane about a horizontal axis, said means including a power shaft rotatable in opposite directions and disposed substantially parallel to the axis of the frame, a pivotal lever mounted intermediate the power shaft and the axis of the frame for swinging movement in opposite directions with its free extremity movably engaging beneath the rocking frame, and means operatively connecting the power shaft with the rocking frame and with the pivotal lever whereby to positively impart pivotal movement to the lever and rocking frame in one direction responsive to rotation of the power shaft in one direction, and to directly impart rocking movement to the rocking frame in the opposite direction responsive to rotation of the power shaft in the opposite direction, said last named means comprising a flexible connector having one end secured to the rocking frame and extending about the power shaft so as to be actuated thereby, and thence extending about the axis of the rocking frame with its opposite end yieldably anchored to the rocking frame so as to form an intervening loop, and means carried by the pivotal lever and embraced by said loop so as to produce pivotal movement of the lever responsive to variation in the length of the loop pursuant to rotation of the power shaft.

12. The combination with a rocking frame, of means for rocking the same in opposite directions in a vertical plane about a horizontal axis, said means including a power shaft rotatable in opposite directions and disposed substantially parallel to the axis of the frame, a pivotal lever mounted intermediate the power shaft and the axis of the frame for swinging movement in opposite directions with its free extremity movably engaging beneath the rocking frame, and means operatively connecting the power shaft with the rocking frame and with the pivotal lever whereby to positively impart pivotal movement to the lever and rocking frame in one direction responsive to rotation of the power shaft in one direction, and to directly impart rocking movement to the rocking frame in the opposite direction responsive to rotation of the power shaft in the opposite direction, said last named means comprising a flexible connector having one end secured to the rocking frame and extending about the power shaft so as to be actuated thereby, and thence extending about the axis of the rocking frame with its opposite end yieldably anchored to the rocking frame so as to form an intervening loop, means carried by the pivotal lever and embraced by said loop so as to produce pivotal movement of the lever responsive to variation in the length of the loop pursuant to rotation of the power shaft, and brake means for holding the power shaft against rotation and consequently preventing rocking movement of the rocking frame.

13. In a tree transplanting device, a vehicle including a chassis frame, a sub-frame mounted on and fixedly secured to the chassis frame, a frame pivotally mounted on the sub-frame intermediate its ends to swing vertically about a horizontal axis, and having its opposite ends provided with saddles for engaging the trunk of a tree or the like, means for securing the tree to at least one of the saddles, and means for rocking the pivotally mounted frame with the tree thereon about said axis, said last named means comprising a power transmission including a power shaft adapted to be driven thereby in opposite directions, a lever pivotally mounted on the sub-frame at one side of the axis of the pivotal frame and having its free extremity movably engagable beneath the pivotal frame so as to rock the same responsive to pivotal movement of the lever, and means operatively connecting the power shaft with the pivotal frame and with the pivotal lever aforesaid whereby to positively impart pivotal movement to the lever in one direction responsive to rotation of the power shaft in one direction, and to directly impart rocking movement to the pivotal frame in the opposite direction responsive to the rotation of the power shaft in the opposite direction.

14. A device of the class described, comprising a sub-frame, a frame pivotally mounted on the sub-frame intermediate its ends to swing vertically about a horizontal axis, and having its opposite ends provided with saddles, means for rocking the pivotal frame about said axis, said last named means comprising a power transmission mounted on the sub-frame, including a power shaft adapted to be driven thereby in opposite directions, a lever pivotally mounted on the sub-frame at one side of the axis of the rocking frame and having its free extremity movably engagable beneath the rocking frame so as to rock the same responsive to pivotal movement of the lever, and means operatively connecting the power shaft with the rocking frame and with the pivotal lever aforesaid, whereby to positively impart pivotal movement to the lever in one direction responsive to rotation of the power shaft in one direction, and to directly impart rocking movement to the rocking frame in the opposite direction responsive to rotation of the power shaft in the opposite direction, the whole constituting a portable unit for lifting, resetting, or otherwise handling trees, poles and similar objects.

15. In apparatus of the class described, a pivotal frame, pivotal means pivoted remote from the pivotal axis of the frame and operatively engaged with the frame for moving the frame in one direction about its pivot, and a second means for moving the frame in the opposite direction about its pivot, said last named means also constituting a means for operating said first named pivotal means to cause the movement of the frame in the first mentioned direction.

16. In apparatus of the class described, a pivotal frame, means for moving said frame in one direction, and flexible power transmission means having its opposite ends respectively connected to the frame aforesaid at opposite sides of its pivotal axis and also having an intermediate portion thereof operatively engaged with the first named means for operating the latter.

JEAN G. BUTTS.